US007860748B2

(12) United States Patent
Vallinen et al.

(10) Patent No.: US 7,860,748 B2
(45) Date of Patent: Dec. 28, 2010

(54) CHARGING IN A COMMUNICATION SYSTEM

(75) Inventors: Juha R. Vallinen, Tampere (FI); Juha-Pekka Koskinen, Hameenlinna (FI)

(73) Assignee: Nokia Corporation, Espoo (FI)

( * ) Notice: Subject to any disclaimer, the term of this patent is extended or adjusted under 35 U.S.C. 154(b) by 1219 days.

(21) Appl. No.: 10/804,087

(22) Filed: Mar. 19, 2004

(65) Prior Publication Data
US 2005/0177469 A1 Aug. 11, 2005

(30) Foreign Application Priority Data
Feb. 6, 2004 (FI) .................................. 20040187

(51) Int. Cl.
*G06Q 30/00* (2006.01)
(52) U.S. Cl. .............................. 705/26; 705/40; 705/44; 705/1; 705/13; 455/405; 709/201
(58) Field of Classification Search .................. 705/26, 705/40, 44, 1, 13; 455/405, 406; 709/201
See application file for complete search history.

(56) References Cited

U.S. PATENT DOCUMENTS

| 4,738,451 | A |   | 4/1988  | Logg              |        |
|-----------|---|---|---------|-------------------|--------|
| 5,558,339 | A |   | 9/1996  | Perlman           |        |
| 5,593,349 | A |   | 1/1997  | Miguel et al.     |        |
| 5,762,552 | A |   | 6/1998  | Vuong et al.      |        |
| 5,779,549 | A |   | 7/1998  | Walker et al.     |        |
| 5,845,267 | A | * | 12/1998 | Ronen ............. | 705/40 |
| 5,855,516 | A |   | 1/1999  | Eiba              |        |
| 5,860,862 | A |   | 1/1999  | Junkin            |        |
| 5,917,725 | A |   | 6/1999  | Thacher et al.    |        |
| 5,938,200 | A |   | 8/1999  | Markowicz et al.  |        |
| 5,964,660 | A |   | 10/1999 | James et al.      |        |
| 5,971,849 | A |   | 10/1999 | Falciglia         |        |
| 6,012,984 | A |   | 1/2000  | Roseman           |        |
| 6,015,344 | A |   | 1/2000  | Kelly et al.      |        |
| 6,029,046 | A |   | 2/2000  | Khan et al.       |        |
| 6,048,271 | A |   | 4/2000  | Barcelou          |        |
| 6,106,399 | A |   | 8/2000  | Baker et al.      |        |
| 6,117,011 | A |   | 9/2000  | Lvov              |        |
| 6,183,366 | B1|   | 2/2001  | Goldberg et al.   |        |
| 6,183,367 | B1|   | 2/2001  | Kaji et al.       |        |
| 6,188,994 | B1| * | 2/2001  | Egendorf ........... | 705/40 |
| 6,203,433 | B1|   | 3/2001  | Kume              |        |
| 6,409,602 | B1|   | 6/2002  | Wiltshire et al.  |        |
| 2002/0002074 | A1 |   | 1/2002  | White et al.   |        |
| 2002/0072412 | A1 | * | 6/2002  | Young et al. .... | 463/42 |
| 2002/0160838 | A1 | * | 10/2002 | Kim ............ | 463/42 |
| 2003/0115203 | A1 | * | 6/2003  | Brown et al. .... | 707/10 |
| 2005/0277472 | A1 | * | 12/2005 | Gillan et al. ... | 463/42 |

\* cited by examiner

*Primary Examiner*—Vanel Frenel
(74) *Attorney, Agent, or Firm*—Alston & Bird LLP (57) ABSTRACT

A method for charging in a communication system is described. The method comprises initiating provision of a service for at least two parties. Further, it is verified that each of the parties is capable of paying for the use of the service. Then, payment information is generated and use of the service is charged based on the payment information. The service may be a game. A communication system configured to provide and charge the service is also disclosed.

14 Claims, 5 Drawing Sheets

CHARGING IN A COMMUNICATION SYSTEM

FIELD OF THE INVENTION

The invention relates to communication systems, and more particularly to charging services provided by means of a communication system.

BACKGROUND OF THE INVENTION

A communication system can be seen as a facility that enables communication sessions between two or more entities such as user equipment and/or other nodes associated with the communication system. The communication session may comprise, for example, voice, data, multimedia and so on. A user equipment may, for example, be provided with a two-way telephone call, multi-way conference call or a data communication session. A user equipment may also be provided with a connection to an application server (AS), for example a service provider server, thus enabling use of services provided by the application server.

A communication system typically operates in accordance with a given standard or specification which sets out what the various entities associated with the communication system are permitted to do and how that should be achieved. For example, the standard or specification may define if the user or, more precisely, the user equipment is provided with a circuit switched service and/or a packet switched service. Communication protocols and/or parameters which are used for the connection may also be defined. In other words, a specific set of "rules" on which the communication can be based on needs to be defined to enable communication by means of the system.

Communication systems proving wireless communication for user equipment are known. An example of the wireless systems is a public land mobile network (PLMN). The PLMNs are typically based on cellular technology. In cellular systems, a base transceiver station (BTS) or similar access entity serves wireless user equipment (UE), such as mobile stations (MS) via a wireless interface between these entities. The communication on the wireless interface between the user equipment and the elements of the communication network can be based on an appropriate communication protocol. The operation of the base station apparatus and other apparatus required for the communication can be controlled by one or several control entities. The various control entities may be interconnected.

One or more gateway nodes may also be provided for connecting the mobile network to other networks, for example to a public switched telephone network (PSTN) and/or other communication networks such as an IP (Internet Protocol) and/or other packet switched data networks. For example, if a requested service is provided by a service provider located in other network, the service request is routed via the mobile network to the other network and then to the service provider.

An example of the services that may be offered for subscribers, such as the users, to a communication system is the so called multimedia services. An example of a communication system enabled to offer multimedia services is the Internet Protocol (IP) Multimedia network. IP Multimedia (IM) functionalities can be provided by means of an IP Multimedia Core Network (CN) subsystem, or briefly IP Multimedia subsystem (IMS). The IMS includes various network entities for the provision of the multimedia services.

It is expected that various types of services are to be provided to users by means of different Application Servers (AS) over the IMS systems. Users or subscribers may be able to use services simultaneously from different contact addresses, such as from different user equipment. It is possible for more than one subscriber to use a service simultaneously in a shared or common session. An example of such use may be a game server providing game services for two or more parties to play together.

Users of a shared service might wish to be able to have some control on how the use of the shared service is to be charged. For example, the users may wish to be able to define before using the service if only one of the parties is to be charged for the use of the service even at the stage when it is not known who that party might be. It might also be desirable in certain circumstances to be able to provide a possibility for selecting division of the charges of the service between the users.

It shall be appreciated that these issues are not limited to any particular communication environment, but may occur in any communication system.

SUMMARY OF THE INVENTION

Embodiments of the invention aim to address one or several of the above problems or issues.

In accordance with an aspect of the invention, there is provided a method for charging in a communication system, the method comprising initiating provision of a service for at least two parties, verifying that each of the parties is capable of paying for the use of the service, generating payment information and charging use of the service based on the payment information. The service may be a game, for example.

In an embodiment, the method further comprises communicating at least one message between the parties regarding a principle for paying for the use of the service and including the principle in the payment information. The step of communication between parties may comprise agreeing between the parties the occurrence that unambiguously defines the party who is responsible for paying for use of the service. The occurrence may be losing a game, for example.

In an embodiment, the method further comprises reserving for a party payment resources from a prepaid account of the party and including the information of the reserved payment resources in the payment information. The payment resources may be reserved in an online charging system. The service may be charged from the reserved payment resources and unused payment resources may be returned. In an embodiment, the service may be charged from one of the parties.

In an embodiment, the method further comprises sending at least one message in accordance with Session Initiation Protocol.

In accordance with another aspect of the invention, there is provided a communication system comprising a network entity configured to provide a service that can be used simultaneously by at least two parties, verification means for verifying that each of the parties is capable of paying for the use of the service, payment information generating means configured to provide payment information for use of the service by the at least two parties and charging means configured to charge use of the service based on the payment information.

In accordance with another aspect of the invention, there is provided a network entity configured to enable simultaneous provision of a service for at least two parties, the network entity comprising verification means for verifying that parties using the service are capable of paying for the use of the service, payment information generating means configured to provide payment information for use of the service by the at least two parties for use in charging for the use of the service.

BRIEF DESCRIPTION OF THE FIGURES

The invention will now be described in further detail, by way of example only, with reference to the following examples and accompanying drawings, in which.

DETAILED DESCRIPTION OF THE PREFERRED EMBODIMENTS

Figure 1:
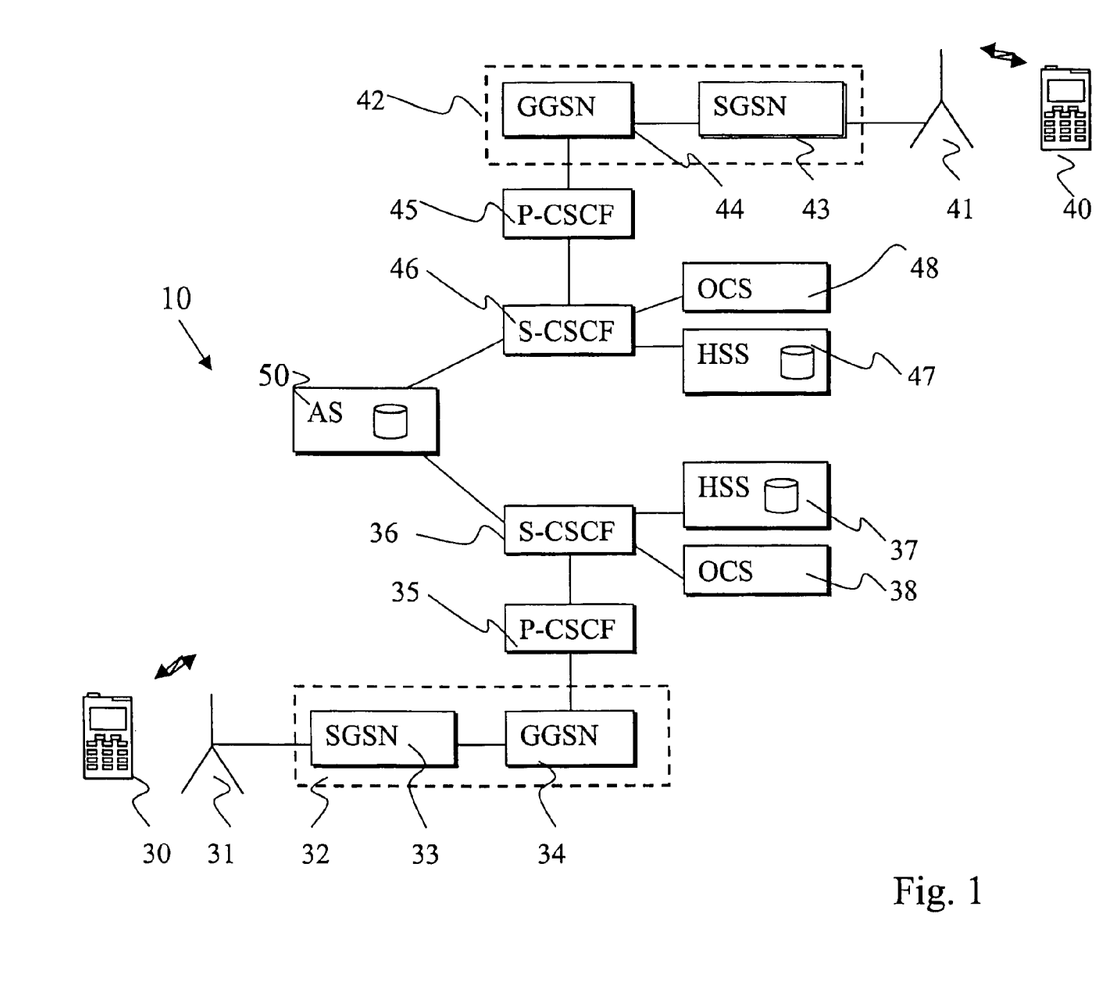
FIG. 1 shows an example of a network architecture in which the embodiments of the invention may be implemented.

Reference is made to FIG. 1 showing an example of a network architecture in which the embodiments of the invention may be implemented. In FIG. 1, an IP Multimedia Core Network Subsystem (IMS) 10 is provided for offering IP multimedia services for IMS subscribers. The embodiments are described referring to the IMS, but the same idea may be implemented with other communication systems as well.

The third generation partnership project (3GPP) has defined use of the general packet radio service (GPRS) as a backbone communication system for the provision of the IMS services. Therefore the GPRS will be used in this specification as an example of a possible backbone communication system enabling the multimedia services. The 3GPP has also defined a reference architecture for the third generation (3G) core network which will provide the users of user equipment with access to the multimedia services. This core network is divided into three principal domains. These are the Circuit Switched (CS) domain, the Packet Switched (PS) domain and the Internet Protocol Multimedia Core Network Subsystem (IMS) domain. The last of these, the IMS domain, is for ensuring that multimedia services are adequately managed. The 3GPP IMS domain uses the Session Initiation Protocol (SIP) developed by the Internet Engineering Task Force (IETF) for creating, modifying and terminating sessions with one or more participants (endpoints).

Some embodiments are described in the following by way of example with reference to the exemplifying architecture of such a third generation (3G) mobile communications system. However, it shall be appreciated that the embodiments may be applied to any suitable communication system.

As described above, IMS functionalities can be provided by means of a mobile communication system. A mobile communication system is typically arranged to serve a plurality of mobile user equipments usually via a wireless interface between the user equipment and at least one base station of the communication system. The mobile communication system may logically be divided between a radio access network (RAN) and a core network (CN).

In the arrangement of FIG. 1, a base station 31 is arranged to transmit signals to and receive signals from a user equipment 30 of a mobile user via a wireless interface between the user equipment and the radio access network. Correspondingly, the user equipment is able to transmit signals to and receive signals from the radio access network via the wireless interface. In the arrangement of FIG. 1, the user equipment 30 may access the IMS 10 via the access network associated with the base station 31, respectively.

Another user equipment 40 and, respectively, a base station 41 are arranged to transmit and receive signals between each other via a wireless interface.

It shall be appreciated that, although for clarity reasons FIG. 1 shows two base stations of only two radio access networks, a typical communication network system usually includes a number of radio access networks.

The 3G radio access network (RAN) is typically controlled by appropriate radio network controller (RNC). These controllers are not shown in FIG. 1 in order to enhance clarity. A controller may be assigned for each base station or a controller can control a plurality of base stations, for example in the radio access network level. It shall thus be appreciated that the name, location and number of the network controllers depend on the system.

The user equipment 30, 40 may comprise any appropriate user equipment adapted for Internet Protocol (IP) communication to connect the network. For example, the mobile user may access the cellular network by means of a Personal computer (PC), a Personal Digital Assistant (PDA), a mobile station (MS), or in general, a user equipment (UE). The following examples are described in the context of user equipment.

One skilled in the art is familiar with the features and operation of typical user equipment. Thus, it is sufficient to note that the user may use a user equipment for tasks such as for making and receiving phone calls, for receiving and sending data from and to the network and for experiencing multimedia content or otherwise using multimedia services. A user equipment may include an antenna for wirelessly receiving and transmitting signals from and to base stations of the mobile communication network. A user equipment may also be provided with a display for displaying images and other graphical information for the user of the user equipment. Camera means may be provided for capturing still or video images. Speaker means are also typically provided. The operation of a user equipment may be controlled by means of an appropriate user interface such as control buttons, voice commands and so on. Furthermore, a user equipment is provided with a processor entity and a memory means.

It shall be appreciated that although only two user equipment are shown in FIG. 1 for clarity, a number of user equipment may be in simultaneous communication with base stations of a mobile communication system.

The core network (CN) entities typically include various switching and other control entities and gateways for enabling the communication via a number of radio access networks and also for interfacing a single communication system with one or more communication systems, such as with other cellular systems and/or fixed line communication systems. In the 3GPP systems, the radio access network controller is typically connected to an appropriate core network entity or entities such as, but not limited to, a serving general packet radio service support node (SGSN) 33, 43. The radio access network controller is in communication with the SGSN via an appropriate interface, for example on an Iu interface.

The SGSN, in turn, typically communicates with a gateway GPRS support node (GGSN) 34, 44 via the GPRS backbone network 32, 42. This interface may be a switched packet data interface.

In a 3GPP network, a packet data session is established to carry traffic flows over the network. Such a packet data session is often referred to as a packet data protocol (PDP) context. A PDP context may include a radio bearer provided between the user equipment and the radio network controller, a radio access bearer provided between the user equipment, the radio network controller and the SGSN, and switched packet data channels provided between the SGSN and the GGSN. Each PDP context usually provides a communication pathway between a particular user equipment and the GGSN and, once established, can typically carry multiple flows. Each flow normally represents, for example, a particular service and/or a media component of a particular service. The PDP context therefore often represents a logical communication pathway for one or more flow across the network. To implement the PDP context between user equipment and the SGSN, radio access bearers (RAB) need to be established which commonly allow for data transfer for the user equipment. The implementation of these logical and physical channels is known to those skilled in the art and is therefore not discussed further herein.

FIG. 1 shows an application server 50. The user equipment 30, 40 may connect, via the GPRS network, to the application server that is connected to one or more data networks such as, but not limited to, the exemplifying Internet Protocol (IP) network. It shall be appreciated that a great number of application servers may be connected to each data network. In the following, an example of a connection is described referring to the user equipment 30. It shall be appreciated that respective details may be employed for the connection of the user equipment 40 to the application server.

The communication systems have developed in the direction wherein services are provided for the user equipment by means of various functions of the data network that are handled by controller entities, such as servers. For example, in the current third generation (3G) wireless multimedia network architectures, it is assumed that several different servers providing various control functions are used for the service provision control. These include functions such as the call session control functions (CSCFs). The call session control functions may be divided into various categories such as a proxy call session control function (P-CSCF), interrogating call session control function (I-CSCF), and serving call session control function (S-CSCF). It shall be appreciated that similar functions may be referred to in different systems with different names. For example, in certain applications the CSCFs may be referenced to as the call state control functions.

A user who wishes to use services provided by the IMS may need first to register with a serving controller, such as the serving call session control function (S-CSCF) 36. As shown in FIG. 1, communication between the S-CSCF 36 and the user equipment 30 may be routed via at least one proxy call session control function (P-CSCF) 35. The P-CSCF 35 is thus for proxying messages to the S-CSCF 36. The serving controller, i.e. S-CSCF 36 in FIG. 1, in turn, provides the control entity the user equipment 30 needs to be registered with. The registration is required, for example, to enable the user equipment to request for a service from an application server (AS) or running end-to-end applications with another user equipment.

The system of FIG. 1 is further arranged such that a user who has been provided with required communication resources by the backbone network and is registered to the serving controller 36. When a user initiate any request, the request traverses through the serving controller 36.

A user information storage entity may also be provided for storing information associated with the subscription of the respective user equipment. The user information storage entity may locate in a server of the home network of the subscription. Such subscriber information storage entities may be called by different terms in different communication systems, examples being a Home Location Register (HLR) in the Global System for Mobile Communications (GSM) or a Home Subscriber Server (HSS) in the IMS. In the particular embodiment illustrated in FIG. 1, the storage entity is shown to be provided by means of a home subscriber server (HSS) 37. The HSS 37 can be queried by other function entities over the appropriate reference points, e.g. during session set-up procedures and later. The subscriber information may include information such as data required for authentication purposes (e.g. registration identities of the subscriber or the user equipment) and so on. The HSS 37 can also be used for storing permanently subscriber profile information.

More than one user equipment 30, 40 may be simultaneously connected to the same application server 50. The user equipment 30, 40 may also share a common session with the application server 50. This may be the case, for example, when the application server 50 provides gaming services for two or more users to participate simultaneously over the network.

The embodiments of the invention are based on the realization that it might be advantageous to be able to provide a capability for parties, i.e. the users sharing a common session, to be able to control who is to be charged for the use of the service. For example in gaming services, it might be desired to agree that a loser of the game pays service usage fee for all other users. In order to avoid any participants who cannot pay at the end, it might be useful to be able to reserve money in advance for a selected service and to provide charge notification to the users.

An embodiment of the invention may enable flexible charging schemes. An embodiment may give a possibility to see charging information for a service and to accept or reject the service according to given information.

In the following, it is assumed that the service price is fixed, but the service price could also vary, for example based on signalling load, service type, duration of the connection, number of players, time of the day and so on. The exemplary service used herein is a game provide by a game server. However, the same principles may be used in relation to other appropriate services.

In the IMS, the serving controller, such as the S-CSCF, may be enabled to query information from other network entities, such as the user information storage entity, such the HSS. As mentioned above, the user information storage entity stores subscriber related information. In an embodiment of the invention, there is a second system connected to the serving controller participating in charging in the communication system. This second system may be called an online charging system (OCS) 38, 48. In an embodiment of the invention, the user information storage entity or the online charging system may include information associated with prepaid accounts of the users. The prepaid account may function such that a certain amount of payment resources is placed in advance in the prepaid account of the user and the user information storage entity or the online charging system distributes the resources to the entities requiring prepayment and controls balance of the prepaid account.

In an embodiment, two users, User-A using a first user equipment 30 and User-B using a second using equipment 40, are registered to an application server 50, such as a game server. The users may first negotiate between each other the principle of paying the service. For example, in the embodiment of gaming over the network, it may be agreed that the loser of the game pays the game of the both users. The price of the service, such as the price of the game, is then delivered to the entity controlling the charging of the service. The entity controlling the charging may be the serving controller associated with each user equipment 30, 40, such as the S-CSCF 36 and the S-CSCF 46. According to an alternative, the entity controlling charging of the service may be the application server 50. The price of the service may be reserved from the prepaid account by the OCSs 38 and 48.

When the entity controlling charging of the service has received confirmation that both users are capable of paying for the service, use of the actual service may begin. When the service is finished, the service may be charged in accordance with the principle agreed between the users. For example, if it was agreed that the loser pays the game of both users, the price of the game is charged from the resources reserved from the prepaid account of the lost user and the resources reserved from the prepaid account of the other user are returned to the prepaid account of that user. The same principle may be applied for more than two users, as well.

Figure 2:
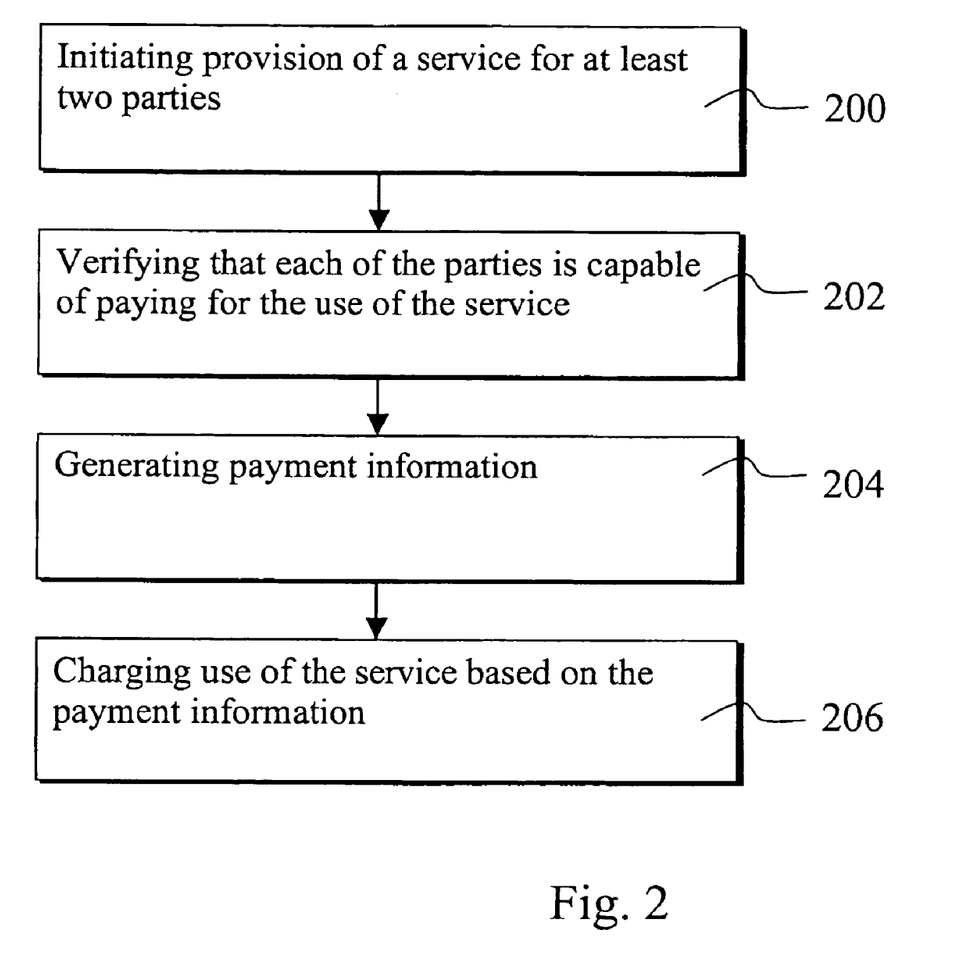
FIG. 2 shows a flow chart illustrating an embodiment of the invention.

FIG. 2 shows a flowchart illustrating an embodiment of the invention. In step 200, provision of a service for at least two parties is initiated. In step 202, it is verified that each of the parties is capable of paying for the use of the service. In step 204, the payment information is generated. In step 206, use of the service is charged based on the payment information.

All the parties wishing to use the service may request or subscribe the service by themselves. In an alternative, at least one of the parties may invite or propose the other parties to use the service together.

In an embodiment, at least one message between the parties is communicated regarding a principle for paying for the use of the service. In other words, the parties may negotiate or agree a principle according to which the service is to be paid, for example an occurrence that unambiguously defines the party who will be responsible for paying for use of the service. In the gaming server case, it may be agreed that the party who loses the game shall pay the gaming fee for all the parties. Any other principle may be agreed, as well. The principle may be included in the payment information.

In an embodiment, the parties wishing to use the shared service may have a prepaid account storing payment resources for using services, as was explained above. Typically, the payment resources are prepaid money on the prepaid account, which may be managed by an operator of the home network of a subscriber or some other appropriate entity. The prepaid account may be managed by and the reservation may be done by the online charging server (OCS). When a party requests or agrees an invitation to become the party of the shared service, payment resources may be reserved from the prepaid account of that party. The amount of payment resources reserved may be based, for example, on the price of the service. The price of the service may be fixed or varying for example in function of the signalling load or the service type and so on. The reservation may cover the total cost or an estimated cost of the service or it may be decided on another basis.

The service may be charged from the reserved payment resources. If more payment resources were reserved than needed for paying the service, the remaining payment resources may be returned to the prepaid accounts of the respective users. For example, in the case of the gaming example, the price of the game may be charged from the payment resources reserved from the prepaid account of the party who loses the game. In an alternative embodiment, the reserved resources may be used in a subsequent service session.

Preferably, at least a part of the communication is based on the session initiation protocol (SIP).

A communication system being adapted to carry out the embodiments of the invention may comprise a network entity configured to provide a service that can be used simultaneously by at least two parties and to process payment information associated with the parties. The network entity may be, for example, a serving controller, such as a S-CSCF, or an application server. Furthermore, verification means for verifying that each of the parties is capable of paying from the use of the service and means configured to generate the payment information are also provided. The payment information generating means may comprise a server including a database storing the payment information. The payment information generating means may be located in the network entity configured to provide the service, such as the serving controller, such as a S-CSCF, or the application server or in another appropriate network entity. Furthermore, the system may comprise charging means configured to charge the service based on the payment information. The charging means may be located in an appropriate server, for example in the server including the database storing the payment information. The charging means may also be located in the network entity configured to provide the service.

In an embodiment, the payment information generating means are configured to enable the parties to negotiate a principle of paying the use of the service and to include the principle in the payment information. The payment information generating means may be included in one of the servers participating in SIP sessions.

In an embodiment, the system comprises a prepaid account for each party wishing to use the service. The details of implementing the prepaid account were described above.

Figure 3:
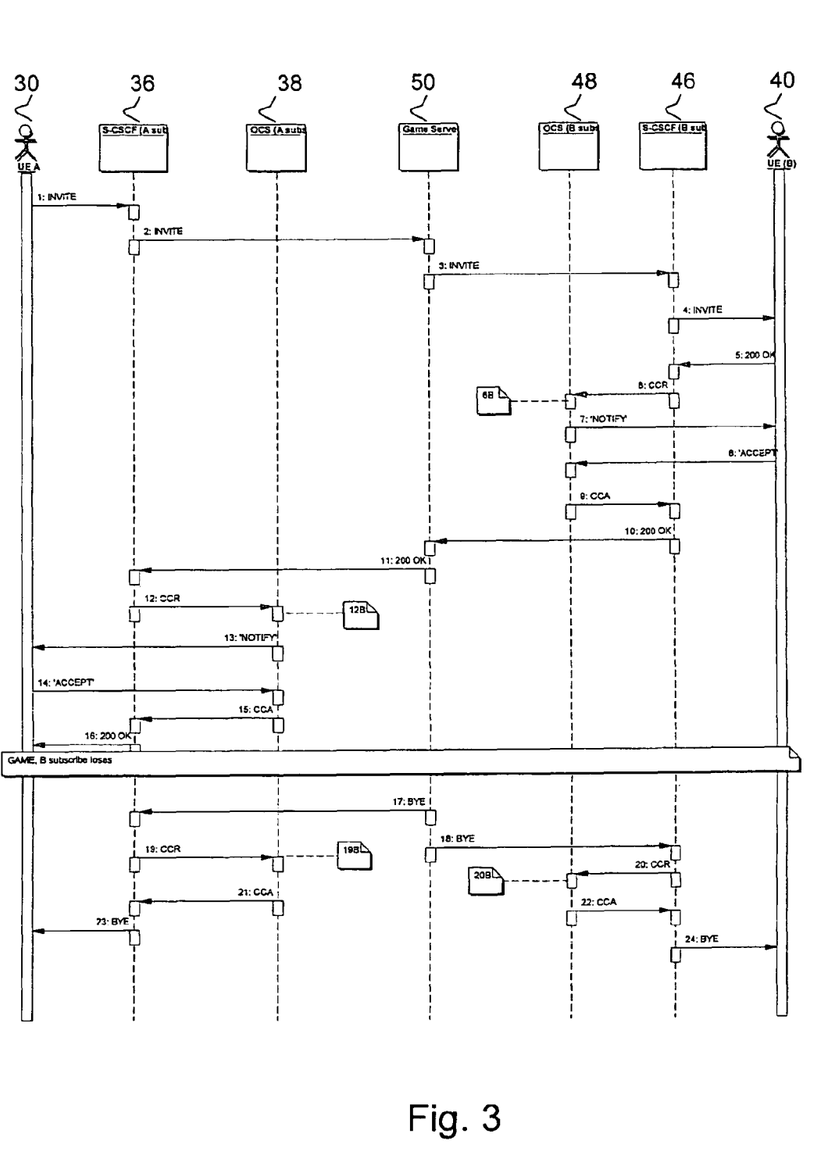
FIG. 3 shows an exemplifying signalling flowchart for an embodiment of the invention.

Reference is now made to FIG. 3 showing the signal flow in an embodiment employing the SIP. The numbers listed below refer to the messaging step numbers shown in FIG. 3. In the FIG. 3 embodiment, the user A using the user equipment UE(A) invites another user (user B) using the user equipment UE(B) for a game.

1. An INVITE message may be sent from a first user equipment (UE(A)) 30 to a connection processing server (S-CSCF(A)) 36 serving the UE(A). This is used to initiate a session establishment.

2. The INVITE message may be sent from the S-CSCF(A) to a game server 50.

3. The INVITE message may be sent from the game server to a connection processing server (S-CSCF(B)) 46 serving a second user equipment (UE(B)) 40. This message may include payment information, such as a proposed payment principle, such as a subject-header "Challenge: Loser pays". This proposed payment principle may be comprised in the initial INVITE message or may be inserted by the game server 50. The price of the service may also be included in this message, for example as "P-CHARGING_INFO header ('Price')".

4. The INVITE message may be sent from the S-CSCF(B) to the UE(B). This message may include the proposed payment information or only a part of the payment information, such as the "challenge".

5. 200OK acknowledgement message may be sent from the UE(B) to the S-CSCF(B).

6. A credit control request message CCR(initial) may be sent from the S-CSCF(B) to an online charging system (OCS (B)) 48 serving the UE(B). The payment information or part of it, such as the price of the service may be delivered to the OCS(B).

6B. The OCS(B) may verify the payment information, for example by checking if there are enough resources in a pre-paid account associated with the UE(B). If the verification shows that the payment information may be followed, the OCS(B) may reserve resources in accordance with the payment information.

7. The OCS(B) may then notify the UE(B) of the verified payment principle, such as "GAME PRICE(B) for you, if you lose this game".

8. The UE(B) may confirm accepting the payment principle.

9. A credit control answer message CCA may be sent from the OCS(B) to the S-CSCF(B) confirming that there is enough money to be reserved by the OCS(B) correspond to the price of the game.

10. 200OK may be sent from the S-CSCF(B) to the game server.

11. 200OK GAMEprice(A) may be sent from the game server to the S-CSCF(A).

12. A CCR(initial) may be sent from the S-CSCF(A) to an online charging system (OCS(A)) 38 serving the UE(A). The payment information or part of it, such as the price of the service may be delivered to the OCS(A).

12B. The OCS(A) may verify the payment information, for example by checking if there are enough resources in a pre-paid account associated with the UE(A). If the verification shows that the payment information may be followed, the OCS(A) may reserve resources in accordance with the payment information.

13. The OCS(A) may then notify the UE(A) of the verified payment principle, such as "GAME PRICE for you, if you lose this game".

14. The UE(A) may then confirm accepting the payment principle.

15. A CCA may be sent from the OCS(A) to the S-CSCF (A) confirming that there is enough money to be reserved by the OCS(A) corresponding to the price of the game.

16. 200OK may be sent from the S-CSCF(A) to the UE(A).

Then, the game may take place. In this example, we assume that the user of the UE(B) loses the game.

17. The game server may inform in a termination message BYE the S-CSCF(A) that the UE(A) won the game. The message may comprise, for example, a subject-header "You won!!" and "P-CHARGING_INFO header ('Free')".

18. The game server may inform in a termination message BYE the S-CSCF(B) that the UE(B) lost the game. The message may comprise, for example, a subject-header "You lost!!".

19. The S-CSCF(A) may send a CCR(initial) including the P-CHARGING_INFO header ('Free') to the OCS(A).

19B. The OCS(A) may release the reserved units of user A.

20. A CCR(termination) may be sent from the S-CSCF(B) to the OCS(B).

20B. The OCS(B) may deduct the price of the game from the reservation of user B.

21. A CCA may be sent from the OCS(A) to the S-CSCF (A).

22. A CCA may be sent from the OCS(B) to the S-CSCF (B).

23. A BYE may be sent from the S-CSCF(A) to the UE(A).

24. A BYE may be sent from the S-CSCF(B) to the UE(B).

Figure 4:
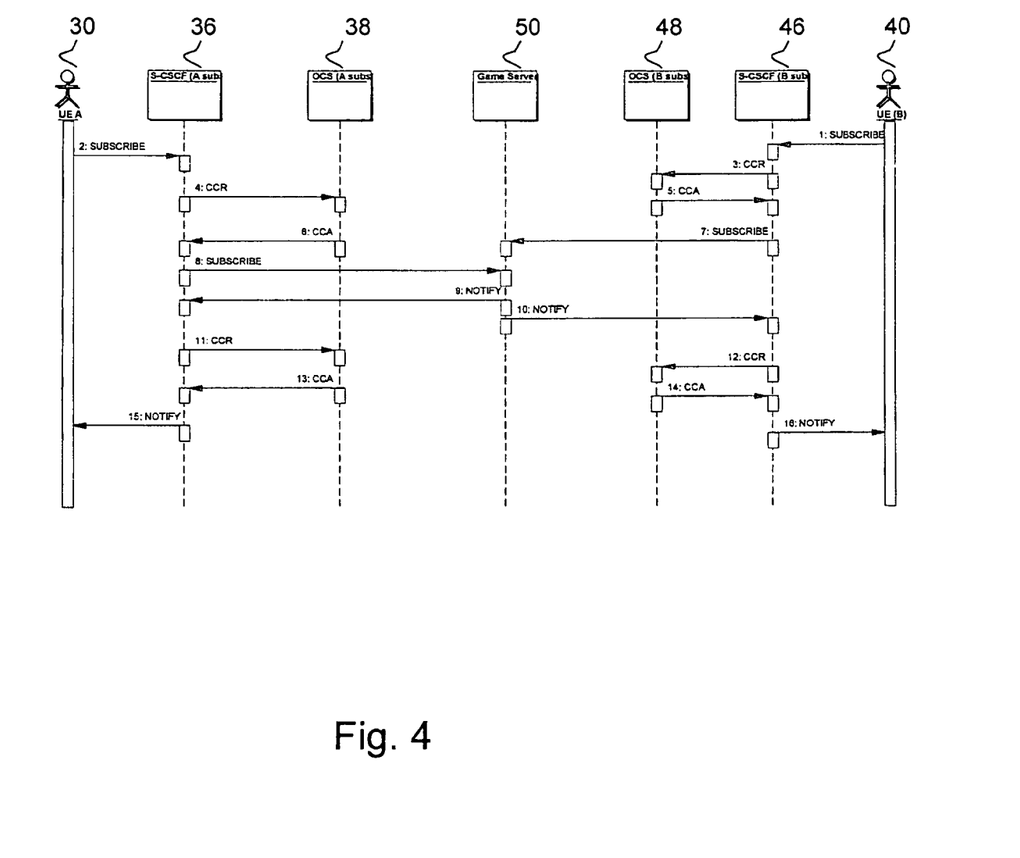
FIG. 4 shows an exemplifying signalling flowchart for a further embodiment of the invention.

Reference is now made to FIG. 4 showing the signal flow in a further embodiment. The numbers listed below refer to the step numbers shown in FIG. 4. In the FIG. 4 embodiment, the parties wishing to share the game, UE(A) 30 and UE(B) 40, both request from their side for the gaming session.

1. A SUBSCRIBE message may be sent from a second user equipment (UE(B)) 40 to a connection processing server (S-CSCF(B)) 46 serving the UE(B). This is used to initiate a session establishment and to request a gaming session from the UE(B) part.

2. A SUBSCRIBE message may be sent from a first user equipment (UE(A)) 30 to a connection processing server (S-CSCF(A)) 36 serving the UE(A). This is used to initiate a session establishment and to request a gaming session from the UE(A) part.

3. A credit control request message CCR may be sent from the S-CSCF(B) to an online charging system (OCS(B)) 48 serving the UE(B).

4. A credit control request message CCR may be sent from the S-CSCF(A) to an online charging system (OCS(A)) 38 serving the UE(A).

5. A credit control answer message CCA may be sent from the OCS(B) to the S-CSCF(B).

6. A credit control answer message CCA may be sent from the OCS(A) to the S-CSCF(A).

7. The SUBSCRIBE message may be forwarded from the S-CSCF(B) to the game server 50.

8. The SUBSCRIBE message may be forwarded from the S-CSCF(A) to the game server 50.

9. A NOTIFY message may be sent from the game server to the S-CSCF(A). The price of the service may be included in this message, for example as "P-CHARGING_INFO header ('GAMEPrice')".

10. A NOTIFY message may be sent from the game server to the S-CSCF(B).

11. A credit control request message CCR(initial) may be sent from the S-CSCF(A) to the OCS(A). The payment information or part of it, such as the price of the service may be delivered to the OCS(A). Resources may be reserved in the OCS(A).

12. A credit control request message CCR(initial) may be sent from the S-CSCF(B) to the OCS(B). The payment information or part of it, such as the price of the service may be delivered to the OCS(B). Resources may be reserved in the OCS(B).

13. A CCA may be sent from the OCS(A) to the S-CSCF (A).

14. A CCA may be sent from the OCS(B) to the S-CSCF (B).

15. The notification of a game may be send in a NOTIFY message from the S-CSCF(A) to the UE(A) informing that a game partner is available. Agreed principles of payment may be included in this message.

16. A NOTIFY message may be sent from the S-CSCF(B) to the UE(B).

The game may then start and the method may continue, for example, as in the FIG. 3 embodiment.

Figure 5:
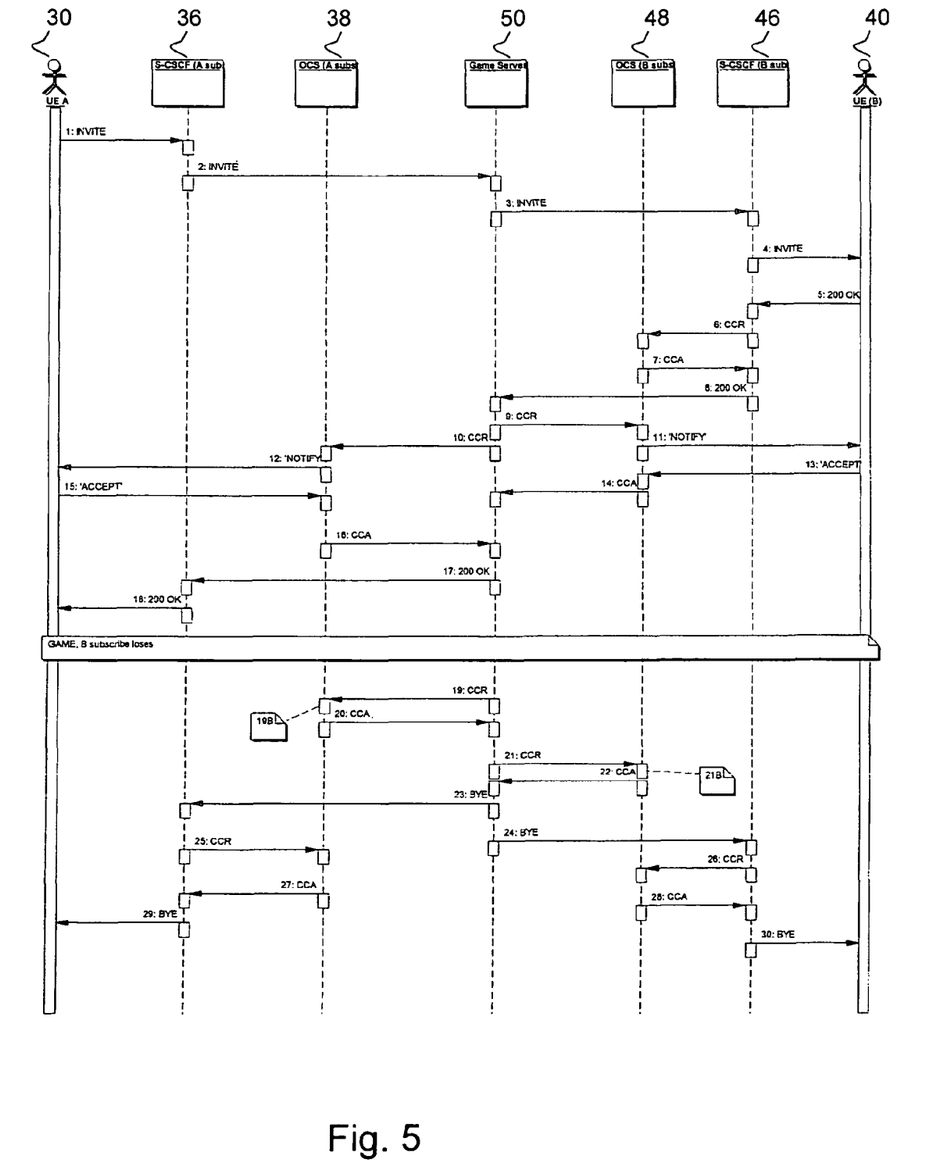
FIG. 5 shows an exemplifying signalling flowchart for a further embodiment of the invention.

Reference is now made to FIG. 5 showing the signal flow in a further embodiment. The numbers listed below refer to the step numbers shown in FIG. 5. In the FIG. 5 embodiment, the parties wishing to share the game, UE(A) and UE(B), both request from their side for the gaming session.

1. An INVITE message may be sent from a first user equipment (UE(A)) 30 to a connection processing server (S-CSCF(A)) 36 serving the UE(A).

2. The INVITE message may be sent from the S-CSCF(A) to a game server 50. This message may include the address of an online charging system (OCS(A)) 38 serving the UE(A) to be delivered to the game server.

3. The INVITE message may be sent from the game server to a connection processing server (S-CSCF(B)) 46 serving a second user equipment (UE(B)) 40. This message may include payment information, such as a proposed payment principle, such as a subject-header "Challenge: Loser will pay".

4. The INVITE message may be sent from the S-CSCF(B) to the UE(B). This message may still include the proposed payment information or only a part of the payment information, such as the "challenge".

5. 200OK may be sent from the UE(B) to the S-CSCF(B).

6. A credit control request message CCR(initial) may be sent from the S-CSCF(B) to an online charging system (OCS (B)) 48 serving the UE(B). This CCR may be related to the normal session charging.

7. A credit control answer message CCA may be sent from the OCS(B) to the S-CSCF(B).

8. 200OK may be sent from the S-CSCF(B) to the game server. This message may include the address of the OCS(B) to be delivered to the game server.

9. A CCR(initial) may be sent from the game server to the OCS(B). This CCR may be initiated to get an acceptance of reservation of resources in the name of the UE(B).

10. A CCR(initial) may be sent from the game server to the OCS(A). This CCR may be initiated to get an acceptance of reservation of resources in the name of the UE(A).

11. The OCS(B) may then notify the UE(B) of the verified payment principle, such as "GAMEPrice for you, if you lose".

12. The OCS(A) may then notify the UE(A) of the verified payment principle, such as "GAMEPrice for you, if you lose".

13. The UE(B) may confirm accepting the payment principle.

14. A CCA may be sent from the OCS(B) to the game server confirming that there is money enough to be reserved by the OCS(B) corresponding to the price of the game.

15. The UE(A) may then confirm accepting the payment principle and/or the game price.

16. A CCA may be sent from the OCS(A) to the game server, confirming that there is money enough to be reserved by the OCS(A) corresponding to the price of the game.

17. 200OK may be sent from the game server to the S-CSCF(A).

18. 200OK may be sent from the S-CSCF(A) to the UE(A).

Then, the game may take place. In this example, we assume that the user of the UE(B) loses the game.

19. The game server may inform in a CCR(termination) the OCS(A) that the UE(A) won the game and the game is free for the user A.

19B. The OCS(A) may release the reserved units of the user A.

20. A CCA may be sent from the OCS(A) to the game server.

21. The game server may inform in a CCR(termination) the OCS(B) that the UE(B) lost the game and that the game is to be paid by the user B.

21B. The OCS(B) may deduct the price of the game from the reservation of the user B.

22. A CCA may be sent from the OCS(B) to the game server.

23. A termination message BYE may be sent from the game server to the S-CSCF(A).

24. A BYE may be sent from the game server to the S-CSCF(B).

25. A CCR(termination) may be sent from the S-CSCF(A) to the OCS(A).

26. A CCR(termination) may be sent from the S-CSCF(B) to the OCS(B).

27. A CCA may be sent from the OCS(A) to the S-CSCF (A).

28. A CCA may be sent from the OCS(B) to the S-CSCF (B).

29. A BYE may be sent from the S-CSCF(A) to the UE(A).

30. A BYE may be sent from the S-CSCF(B) to the UE(B).

Although the invention has been described in the context of particular embodiments, various modifications are possible without departing from the scope and spirit of the invention as defined by the appended claims. For example, the communication system used in the various embodiments may be any appropriate communication system, such as the Global System for Mobile Communications (GSM) or local area communication system. The application server may be another appropriate server than the exemplary game server. The serving controller and the user information storage entity may be network entities called with different names in various communication systems. These entities may also carry out various additional tasks. It may also be possible that the serving controller and the user information storage entity are network entities dedicated for the purposes of the embodiments of the invention.

The invention claimed is:

1. A method, comprising:
    initiating, at a network server, a provision of a service for at least two parties; verifying that each of the at least two parties is capable of paying for use of the service;
    generating payment information by providing for communication of at least one message between the at least two parties regarding a principle for paying a fee for the use of the service and including the principle in the payment information, the principle comprising a definite choice of which of the at least two parties is responsible for paying the fee,
    wherein the definite choice is determined according to a result of a use of the service by one of the at least two parties that is different from a result of a use of the service by the at least one other of the at least two parties, and
    wherein providing for communication of the at least one message between the at least two parties comprises agreeing, between the at least two parties, to an occurrence that unambiguously defines a party who is responsible for paying for use of the service, and notifying the network server of the agreement; and
    providing for charging for use of the service based on the payment information.

2. The method according to claim 1, wherein the initiating comprises initiating a provision of a game.

3. The method according to claim 1, wherein the agreeing comprises defining the occurrence to be losing a game.

4. The method according to claim 1, further comprising reserving for a party payment resources from a prepaid account of the party and including information of the reserved payment resources in the payment information.

5. The method according to claim 4, wherein the reserving comprises reserving the payment resources in an online charging system.

6. The method according to claim 4, further comprising providing for charging the service to the reserved payment resources and returning unused payment resources.

7. The method according to claim 6, wherein the charging comprises charging the service to one of the at least two parties.

8. The method according to claim 1, further comprising sending at least one message in accordance with Session Initiation Protocol.

9. An apparatus, comprising:
an enabler configured to enable simultaneous provision of a service for at least two parties;
a verifier configured to verify that the at least two parties using the service are capable of paying for use of the service; and
a generator configured to provide payment information for the use of the service by the at least two parties for use in charging for the use of the service by communicating at least one message between the at least two parties regarding a principle for paying a fee for the use of the service and including the principle in the payment information, the principle comprising a definite choice of which of the at least two parties is responsible for paying the fee,
wherein the definite choice is determined according to a result of a use of the service by one of the at least two parties that is different from a result of a use of the service by the at least one other of the at least two parties, and
wherein communicating the at least one message between the at least two parties comprises agreeing, between the at least two parties, to an occurrence that unambiguously defines a party who is responsible for paying for use of the service.

10. An apparatus according to claim 9, further comprising:
a charger configured to charge the service based on the payment information.

11. An apparatus according to claim 9, wherein the apparatus is one of a serving controller and an application server.

12. An apparatus according to claim 11, wherein the apparatus is a game server.

13. A computer program product comprising at least one computer readable storage medium having computer-executable program instructions stored thereon, said computer-executable program instructions configured to control a processor to perform:
    initiating, at a network server, a provision of a service for at least two parties;
    verifying that each of the at least two parties is capable of paying for use of the service;
    generating payment information by communicating at least one message between the at least two parties regarding a principle for paying a fee for the use of the service and including the principle in the payment information, the principle comprising a definite choice of which of the at least two parties is responsible for paying the fee,
    wherein the definite choice is determined according to a result of a use of the service by one of the at least two parties that is different from a result of a use of the service by the at least one other of the at least two parties, and wherein communicating the at least one message between the at least two parties comprises agreeing, between the at least two parties, to an occurrence that unambiguously defines a party who is responsible for paying for use of the service, and notifying the network server of the agreement; and
    charging for use of the service based on the payment information.

14. An apparatus, comprising:
enabling means for enabling simultaneous provision of a service for at least two parties;
verifying means for verifying that the at least two parties using the service are capable of paying for use of the service; and
generating means for generating payment information for the use of the service by the at least two parties for use in charging for the use of the service by communicating at least one message between the at least two parties regarding a principle for paying a fee for the use of the service and including the principle in the payment information, the principle comprising a definite choice of which of the at least two parties is responsible for paying the fee,
wherein the definite choice is determined according to a result of a use of the service by one of the at least two parties that is different from a result of a use of the service by the at least one other of the at least two parties, and
wherein communicating the at least one message between the at least two parties comprises agreeing means for agreeing, between the at least two parties, to an occurrence that unambiguously defines a party who is responsible for paying for use of the service, and notifying the network server of the agreement.

* * * * *